United States Patent Office 3,466,196
Patented Sept. 9, 1969

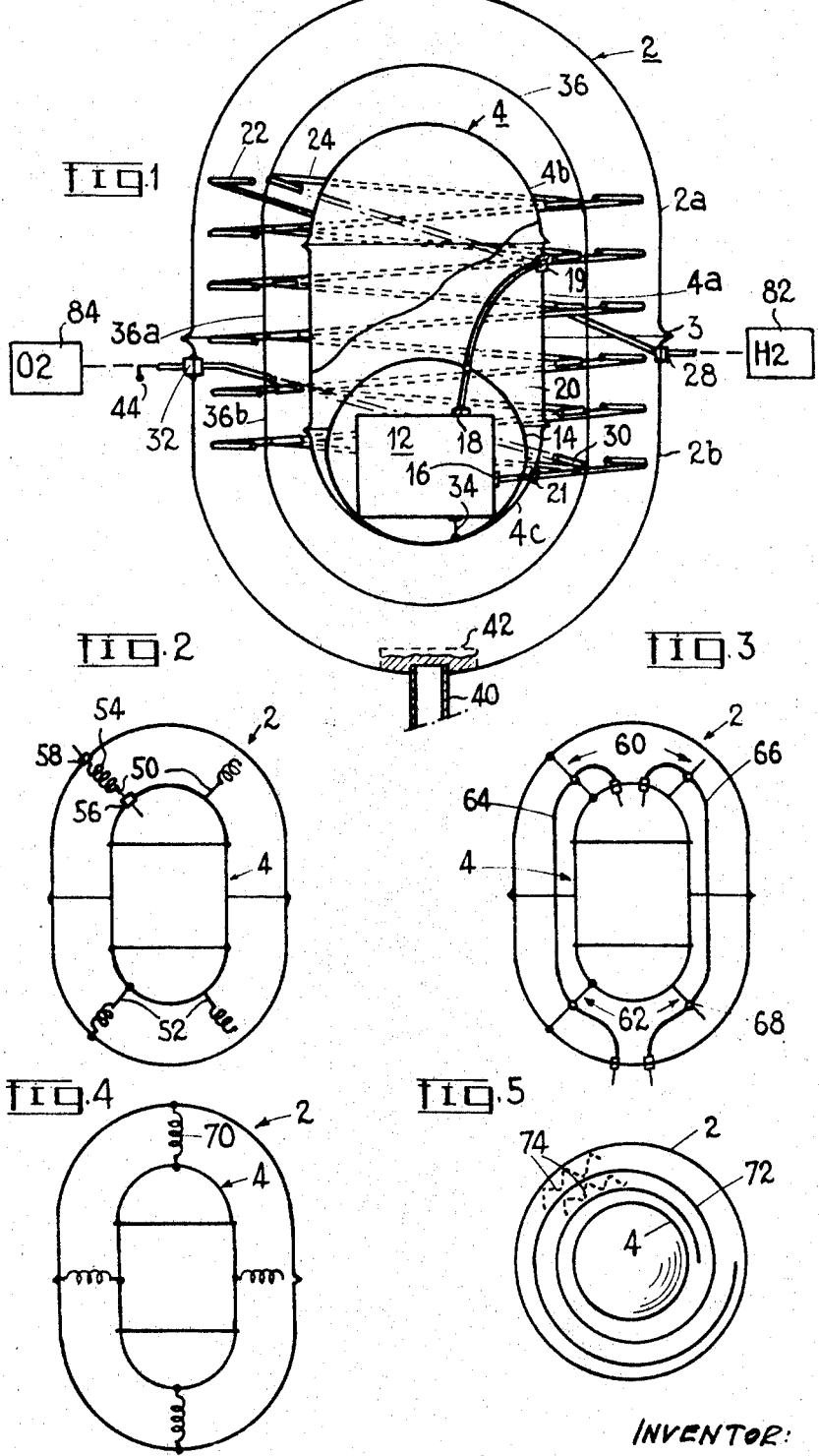

3,466,196
ISOTHERMAL ASSEMBLY
Roland P. Gosmand, Blanc-Mesnil, France, assignor to Compagnie Francaise Thomson Houston-Hotchkiss Brandt, Paris, France, a corporation of France
Filed Nov. 12, 1965, Ser. No. 507,377
Claims priority, application France, Nov. 13, 1964, 994,960
Int. Cl. H01m 27/00
U.S. Cl. 136—86                                     17 Claims

ABSTRACT OF THE DISCLOSURE

A pair of entirely sealed shells are maintained in spaced relation from each other by spirally wound electrical conductors, or tubing, the space between the shells being evacuated; an electronic equipment, such as fuel cells and the like, are located within the inner shell, electrically and hydraulically connected to the wires in the tubing, the equipment being sealed in the inner shell and the space surrounding the equipment being entirely filled with a fluid, such as water, which will undergo phase transformation when the temperature drops, within the inner shell, below freezing to provide long-term protection of the equipment against extreme cold.

---

This invention relates to heat insulating structures capable of protecting temperature-sensitive equipment against low temperatures, especially the temperatures prevalent in the stratosphere and in outer space.

The invention was developed in connection with a meteorological project contemplated for the near future on a worldwide scale. In this project, a satellite is to orbit the earth and is to monitor continuously a large number of weather balloons, many hundred in number, provided with radiosonde equipment and released continuously from many points of the globe. The satellite and the balloons are equipped with a radio communication system whereby atmospheric temperature, pressure and other data as sensed from the respective balloons are transmitted in coded form to the satellite and the latter, every time it orbits past a ground monitor station, retransmits all of the coded data collected by it from the balloons during its recent orbit. It is anticipated that this system, through the permanent analysis it will make possible of the ever-changing meterological conditions all around the earth, will bring about an immensely significant advance in weather analysis and forecasting.

Of the many complex engineering problems raised by the project, the present invention is concerned with the problem involved in protecting the delicate electric and electronic equipment carried by the weather balloons (as well as the satellite) against the very low surrounding temperatures encountered. Thus the balloons, sailing at altitudes of about 30,000 meters, will be subjected to outer temperatures in a range of −50 to −60° C. At these temperatures transistor circuits operate poorly, and power sources, including hydrogen cells, taken as example of the fuel cell type, and conventional storage batteries (such as zinc-cadmium cells) used to power the equipment lose most of their power capacity.

It should be realized that no similar problem has ever arisen in connection with conventional weather balloons since these were generally used to transmit the sensed data only during the comparatively brief climb of the balloon to its maximum altitude, at which the balloon exploded. It is an easy matter to insulate the electronics successfully against excessive chilling for such a brief period, e.g. less than twelve hours. In the type of operation specified herein, on the other hand, the balloons are to remain aloft many days, e.g. up to two weeks, so that conventional insulation would be unavailing.

The problem is, of course, significantly complicated by the drastic space and weight requirements inherent in the specified application.

An additional difficulty is the necessity of providing for some form of electrical connection between the protected electrical or electronic unit and the exterior. Any conductor of electricity also is a conductor of heat. In view of the extraordinarily high heat-insulating performance required if the specified conditions are to be met, it is found that even the low rate of heat leakage occurring over an electrical conductor wire becomes unacceptable unless special precautions are taken.

As will presently appear, the isothermal enclosure of the invention includes, inter alia, a pair of fully sealed inner and outer shells, the inner shell supported within the outer shell with the intervening space being evacuated. Means must be provided for supporting the inner shell in position from the outer shell; preferably the supporting means must constitute a shock- or vibration-mount, in order to protect the delicate internal equipment against excessive accelerations of the kind liable to occur when the balloon is struck by a strong wind gust or caught up in a jetstream. This further complicates the situation, since the inner shell supporting means, if made strong enough to meet the mechanical requirements, are liable to constitute a further leakage path for heat from the isotherm core of the assembly, and thus again detract from the performance.

An especially important embodiment of the invention relates to the case where the equipment to be supported and heat-insulated comprises a hydrogen-cell power source. The problem is then further complicated by the need for providing gas inlet connections leading from external sources of gas supply to the cell. These gas connections must take the form of gas conduits extending across the intervening space between the outer and inner shells, and thus providing an additional path of conductive heat leakage.

The prior art of thermal insulation does not make available apparatus capable of meeting these stringent and conflicting requirements, and it is the main object of this invention to fill this gap. Objects are to provide isothermal assembly of the specified type, which will afford full protection to the payload for many days against outer temperatures ranging down to −60° C. or lower, to do this within the specified limitations in size and weight, and to achieve these results without any sacrifice in the efficiency of electrical connection between the payload and external apparatus, and at the same time provide, where desirable, an efficient shock-mount for the payload. An important object is to provide an improved thermally-insulated hydrogen cell power supply unit.

An exemplary embodiment of the invention and some modifications thereof are illustrated in the accompanying drawings, wherein:

FIG. 1 shows an isothermal assembly according to the invention; in this view, the outer shell and intermediate screen are shown in section, the tube coils are broken off, and the internal shell is partly broken away to make inner structure visible;

FIGS. 2, 3 and 4 are smaller-scale views, somewhat simplified, showing three modifications of the inner shell supporting and electrical connecting means; and FIG. 5 is a simplified cross sectional view illustrating a modified form of the radiation-screening structure.

An isothermal assembly according to this invention comprises two shells 2 and 4 (FIG. 1), each of which is fully sealed, and the inner shell 4 being supported in spaced relation within the outer shell 2. The intermediate space between the shells 2 and 4 is evacuated. The payload to be protected against excessive cold, such as hydrogen cell power unit 12, is placed within the inner shell before this shell has been sealed. Also placed within this inner shell 4 prior to sealing is a body 20 of a substance capable of undergoing a phase transformation at a temperature which is acceptable for the payload 12. As will be understood, throughout the time required for complete phase conversion of this substance, the temperature within the inner shell 4 will remain at the fixed value at which such phase conversion has commenced.

In the currently preferred embodiment, the substance whose phase conversion is relied upon to maintain isothermal conditions is water. Thus, the electronic unit 12 will be held at a temperature of 0° C. throughout the time it takes for the body of water 20 sealed in the inner shell 4 to freeze entirely into ice during ascent of the weather balloon (in the specific application contemplated). Water is an especially efficient medium for the purposes of the invention because of its high heat of solidification. Various additions may, if desired, be added to the water in order to modify its characteristics. Thus, suitable mixes of water and glycol, or water and sodium sulphate, may be used. However, other substances may be used that are capable of changing between the liquid-solid, or vapor-liquid, phases at a temperature acceptable for the payload. Further, instead of using the heat of liquefaction or solidification, i.e. a change of physical phase, the invention may use for a similar purpose the heat of certain chemical reactions or phase conversions, particularly crystallization.

In this respect, the use of calcium chloride hydrate, $CaCl_2 \cdot nH_2O$ is contemplated. This compound crystallizes reversibly from the dihydrate to the tetrahydrate at 45.3° C., and from the tetrahydrate to the hexahydrate at 29° C., releasing respecively 47.5. and 47.7 calories/gramme. Although the thermal efficiency is less than that of the solidification of water, the use of calcium chloride, or some other crystallizable compound, may sometimes prove desirable because it eliminates the presence of a liquid which may occasionally be inconvenient.

It will be evident that the use of the latent heat of phase-conversion of water or any other substance for maintaining isotherm conditions over the specified number of days, in the manner just described, is feasible only if the amount of the substance that has to be provided, as determined by the time required for such amount to be completely converted from one to the other phase, is so small as to fit in with the stringent limitations of space and weight that are specified.

As will be shown hereinafter, the weight of a given substance required for this purpose is directly proportional to the total rate of heat flow from the inner shell 4 to the outre shell 2. This, then, is the decisive factor to be considered.

The applicant's investigations have shown that with a temperature differential of 60° C. across the shells 2 and 4, the total rate of heat flow between the shells must not exceed about 0.22 watt (190 calories/hour) if the specified characteristics are to be approached, and preferably should be of the order of 0.11 watt (95 calories/hour) or less; the investigations have further demonstrated that heat loss between the shells can in fact be held down to such low values in spite of the dual requirement for supporting the inner shell within the outer shell and providing electrical connections across the shells.

The total heat loss is the sum of three factors, which are the rates of heat flow by the three processes of gaseous convection, radiation and conduction through solids.

Heat flow by convection can readily be reduced to an insignificantly low value by evacuating the space between the inner and outer shells to a suitable low pressure, such as $10^{-4}$ and preferably $10^{-5}$ torr.

Heat flow by radiation from the inner shell towards the outer shell is more difficult to control. The conventional expedient of providing a reflective surface finish over the facing surfaces of the shells is generally found insufficient for the present requirements. Means will be described whereby such radiation losses can be reduced to an acceptable value.

The chief difficulty, however, lies with the adequate control of the third source of heat losses, conduction through solids. The presence of solid connecting means between the shells is unavoidable, first because of the obvious necessity of mechanically supporting the inner shell in position, preferably in a shock-proof manner, secondly because of the no less inevitable presence of electrical connections where the payload is electrical apparatus, and thirdly in the present embodiment where the unit 12 is a hydrogen-cell battery, because of the necessary presence of gas connecting tubes.

It is important to note in this connection that a construction of the enclosure in the form of a conventional Dewar vacuum flask, i.e. wherein the inner shell 4 would be connected with the outer shell 2 through a bottle neck, would be hopelessly inadequate for the purposes of the invention because it would result in intolerably high heat loss by conduction through the walls of the bottle-neck as well as atmospheric convection through the bottle neck. The fully sealed construction of each of the inner and outer shells 2 and 4 throughout their surface areas, as here shown and in contrast with conventional isothermal structures, is an essential feature of the invention.

Broadly, in order to minimize heat losses by conduction through the mechanical supporting structure and the electrical connector and gas supply structure, the thermal resistance of said structures must be maximized. To increase the thermal resistance of a heat conductor, three courses are available, just as when increasing the electrical resistance of an electric conductor. Namely, the heat resistivity of the heat conductor can be increased by making the conductor out of a heat isolating material; the length of the heat conductor can be increased; and/or the flow section through it reduced.

In regard to the mechanical supporting structure of the inner shell, in the preferred embodiment of the invention thermal resistance is maximized by greatly increasing the length of the supporting members. Thus, as will be described in greater detail presently, the inner shell 4 is supported in the outer shell 2 by way of two coaxial helically wound elements 22 and 24, of spring steel, each having its opposite ends respectively attached to the inner and the outer shells. The elements 22 and 24, in the present instance, are tubes, and serve to connect the hydrogen cell unit 12 with external sources of hydrogen and oxygen, such as pressure gas containers schematically indicated at 82 and 84. These containers do not require to be heat insulated. The coiled construction shown makes it possible so greatly to increase the length of the heat flow path between the shells that conduction losses can be brought down to the desired low value while still using supporting elements, e.g. tubes, having the desired cross section to provide the requisite mechanical strength (and gas flow section); at the same time the coiled supporting elements of spring steel provide an excellent shock mount for the inner core of the assembly.

As regards the electrical connecting means, the invention contemplates two main methods of increasing the resistance thereof to heat flow while maintaining the requisite electrical conductivity. In one construction, the electrical conductor (or each conductor) is provided in the form of a thin film coating of highly conductive substance, such as copper, aluminum, silver, or graphite, around the surface of a connecting element such as each of the coiled supporting tubes 22 and 24. Such a skin coating will only conduct heat at an insignificantly low rate, while providing an excellent low-impedance conductive path for high-frequency alternating currents. This arrangement therefore is preferred in the case of a connection that is to convey R-F currents to and from the payload 12. The other construction, useful especially for conveying D-C and low frequencies, which do not flow satisfactorily through skin conductor films, employs a conductor wire coiled into a helix. This enables the length of the conductor, and hence its thermal resistance, to be greatly increased without correspondingly reducing its cross section and hence its D-C conductivity.

Preferably, the electrical conductor whether in the form of a thin skin coating or a closely wound helical wire, is associated with the mechanical supporting structure, as by forming such coating or helix around the surface of one of the coiled supporting tubes 22, 24.

By providing the mechanical and electrical connecting means between the shells 2 and 4 in one of the ways disclosed above, it has been found possible to reduce the conduction heat losses therethrough to as little as 0.02 watt (17 calories/hour) and in some cases to less than 0.015 watt (13 calories/hour).

The embodiment shown in FIG. 1 will now be described in greater detail.

The outer shell 2 may be constructed as shown from two similar dished members 2a, 2b of stainless steel welded at their outer ends as at 3 after completion of the entire assembly. The inner shell 4 in this embodiment is made up of three sections, a tubular cylindrical body section 4a and two-half spherical end sections 4b and 4c, welded to one another at their ends as shown, after completion of the internal assembly to be later described. The surfaces of both shells 2 and 4 are provided with a suitable protective and radiation-reflective finish, such as an aluminum coating applied by evaporation in vacuum.

The unit of equipment 12 that is to be maintained at a constant temperature of, say, 0° C., such as radio or other electronic equipment, generally transistorized, or (in the present example) an hydrogen cell battery is enclosed within a sealed bag 14 of suitable plastic sheet material, e.g. a suitable polyamid. The bag 14 is provided at appropriate points with sealed openings through which the inner legs of tubes 22 and 24 respectively are passed. At corresponding points the inner shell 4 is formed with registering sealed openings through which the tubes extend by way of sealed adaptors 19 and 21. The tubes 22 and 24 have their inner ends connected with the hydrogen cell casing 12 at 16 and 18. The plastic container or bag 14 is preferably filled, prior to sealing, with a suitable inert gas or air at a reduced pressure.

The inner shell 4 contains the body of water 20 surrounding the sealed plastic bag 14 and incompletely filling the inner shell 4.

The means supporting the inner shell 4 within the outer shell 2 in spaced relation comprise the tubes 22 and 24. Thus the supporting means, in addition to providing the desired support for the inner shell in a vibration-proof manner, serve the further functions of providing electric and gas flow conducting means for connecting the hydrogen cell unit 12 with external equipment, while providing a long path of thermal flow for minimizing conductive heat transfer between the inner and outer shells. As earlier noted, these largely conflicting functions are accomplished, in this embodiment, by providing the supporting means in the form of the pair of helically wound stainless steel tubes 22 and 24. The tubes are coated with a thin skin coating of conductive material, e.g. copper.

Tube 22 is formed as an outer helix in the annular space defined between the inner and outer shells, and tube 24 is formed as an inner helix. The outer helical tube 22, in the exemplary construction shown, has its lower end part secured at 21 (as by welding) to the outer surface of the lower member 4c of the inner shell 4. The tube 22 then extends outwards from said inner shell to constitute the outer helical coil, winding upwards in a counterclockwise direction (as seen from below), until it reaches an uppermost point, from which point it is deflected downward and outward for attachment to the outer shell 2, somewhat below the equatorial seal 3 thereof, by way of a sealed adaptor 28.

The inner helical supporting tube 24 has its inner end part mechanically attached to the afore-mentioned connector 19 traversing the inner shell, thence extends outwards and upwards to an elevation substantially the same as that of the top of the outer coiled tube 22. From this uppermost point the inner tube 24 winds downwards in the clockwise direction until it has reached the lowermost elevation of the coils. Thence tube 24 extends upwards and outwards as the leg 30 which attaches to a ceramic insulating connector and adaptor 32 sealed in the wall of the outer shell 2 somewhat below its plane of equatorial joint 3 in diametrically opposed relation to the adaptor 28 through which the outer tube 22 attaches to said outer shell.

The outer end of tubes 22 and 24, by way of the adaptors 28 and 32, connect with suitable sources 82 and 84 of hydrogen and oxygen. Further, the outer end of tube 24 is shown connected to an electric terminal 44.

In this embodiment, the outer tube 22 serves as the grounded conductor for the electric line, and hence its conductive skin is electrically connected with the outer shell 2 at the outer point of attachment 28 and with the inner shell 4 at the inner point of attachment 26. Further, the housing 12 of the electric equipment is shown connected by a ground conductor 34 to the inner surface of the inner shell at the bottom thereof, by way of a suitable second sealed aperture in the plastic bag 14.

A radiation screen 36 having a general configuration similar to that of the shells 2 and 4 and dimensions intermediate those of the shells, is interposed in the space between the shells, being supported around the outer surface of the inner tube coil 24 for example. For convenience in assembly, shell 36 is made of more than one section.

The screening shell may be made from any of various sheet materials, such as the plastic resin glycol terephthalate (commercially known as "Mylar", having both its surfaces metal coated as by a film of vacuum-evaporated aluminium. It will be understood that the metal coating of screen 36 is insulated in any suitable manner from the electrically conductive tube, e.g. the outer tube 22.

Also illustrated in FIG. 1 is a sealed pipe connection 40 attached to the lower member 2b of the outer shell 2 and serving to evacuate the space between the two shells 2 and 4 after complete assembly. Further, a container 42 having a body of suitable vapour-absorbing substance, such as silica gel, and provided with a perforate cover, is positioned in the bottom of the outer shell to maintain the desired degree of vacuum therein.

The stainless steel tubes 22 and 24 may be coated on one of their surfaces, e.g. the external surface, with any thin electrically conductive coating, such as gold, silver, aluminium, copper or graphite. A thin metallic skin coating of this kind provides an excellent low-impedance flow path for electric currents, especially R-F currents, while being a very poor conductor of heat. At the same time such a metallic coating increases the reflectivity of the tubes and thus contributes to reducing the transfer of heat by radiation between the shells by way of said tubes.

The manner of assembling the unit of the invention will now briefly be described. The unit of equipment 12 enclosed in the sealed "Mylar" sack 14, with the inner legs of the tubes protruding therefrom, is positioned in the bottom of inner shell member 4c and preferably secured in place with a suitable adhesive resin or otherwise, and the protruding ground connection 34 being soldered to the inner surface of the shell member. Before sealing the cover member 4b of the inner shell, the latter is filled with a body of water 20 in the space left by the bag 14, up to a level somewhat below the upper end of the cylindrical part 4a. The protruding tube sections are applied to the adaptors 19 and 21, and the top cover 4b of the inner shell is carefully welded in place.

With the inner core structure thus assembled and supported on a suitable jig, the inner tube coil 24 is positioned around the inner shell 4 and the inner end of the coil is connected to the adaptor 19, care being taken to establish a good electric contact between lead 18 and the conductive skin layer of tube 24. The outer tube coil 22 in turn is placed in position, and its inner end is connected to adaptor 21. The intermediate Mylar screening shell 36 is mounted in two or more sections around the outer surface of the inner tube coil 24, the ingoing leg of the outer tube and the outgoing leg of the inner tube being passed through suitable holes formed in a lower one of said sections, and the sections of the screening shell 36 are assembled at their mating edges as with an adhesive resin.

The structure is now inserted into the lower member 2b of the outer shell 2. The outer end of the inner tube 24 is fixed to the connector 32 in any suitable manner providing an efficient electric contact between the conductive skin layer of the tube and terminal 44. The outer end of the outer tube 22 is suitably connected to the adaptor 28. The upper shell member 2a is placed in position and its lower end is carefully welded at 3 to the upper end of shell member 2b, around the full circumference of the shell. Finally the space between shells 2 and 4 is evacuated by way of nipple 40 connected to a suitable vacuum pump, and the nipple is sealed off. The vacuum is maintained throughout the service life of the unit by the absorbing action of the silica gel 42 which action is especially effective due to the fact that the silica gel is placed in contact with a low-temperature surface. Any gases and vapours that may be evolved from the metallic and other surfaces are effectively absorbed.

In operation, the unit forms part of the radiosonde equipment of a weather balloon for example. All the parts of the assembly are then at ordinary ambient temperature, say 15° C., at the initial time when the balloon is released. As the balloon rises into the upper reaches of the atmosphere, the external temperature drops rapidly to a minimum of, say, −60° C. The temperature of the inner core of the assembly within inner shell 4, including the hydrogen cell unit 12 and the body of water 20 surmounting it, drops at a slower rate and, as the said internal temperature reaches 0° C., the body of water 20 begins to freeze. The internal temperature then retains the constant value of 0° C. until the entire mass of water has frozen. Thereafter the internal temperature will drop gradually until it eventually also reaches −60° C.

Thus the useful service life of the assembly of the invention is determined as the time required for the body of water 20 to freeze throughout. This time period can be calculated from the following equation:

$$T = \frac{M(80+t_o)}{w} \quad (1)$$

where T is time in hours; M is the mass of water in grammes; $t_o$ is the initial ambient temperature in degrees C; and w is the total rate of heat loss from the inner core of the assembly, in calories per hour. The formula disregards the heat capacity of the inner core and any heat generated in the operation of the appartus contained in the unit 12, and therefore the formula yields a somewhat conservative figure for the effective service life.

Putting $t_o = 15°$ C., the standard ambient temperature, Equation 1 can be rewritten $$\frac{T}{M} = \frac{95}{w} \quad (2)$$

The ratio T/M states the hours useful service life achievable per gramme water provided in the assembly. This ratio can thus be taken as characterizing the performance of the assembly. For the purposes of the present invention, the performance ratio T/M should be not less than about 0.5, preferably not less than 1. This requires that the total heat loss rate w across the sealed shells of the invention shall not exceed about 190 calories/hour (0.22 watt), and preferably shall not exceed 95 calories/hour (0.11 watt), under the specified service conditions that is, with the inner shell at the transformation temperature (herein 0° C.), and the outer shell at the minimum service temperature (−60° C.).

In a practical embodiment of the assembly shown in FIG. 1, the outer shell 2 was made of 0.4 mm. gauge stainless steel, aluminium-coated in vacuum, and its dimensions were 260 millimeters total height and 188 mm. diameter. The inner shell 4, of 0.2 mm. gauge aluminium-coated stainless steel, was 160 mm. long and 90 mm. diameter. The coiled tubes 22 and 24 were made of stainless steel, 3 mm. outer diameter and 0.3 mm. wall thickness, externally coated with a thin film of aluminium. The total length of the inner coiled tube was somewhat more than 2 meters, and that of the outer tube more than 3 meters. The pressure in the evacuated space between the shells was about $10^{-5}$ torr. 325 grammes of water were placed in the inner shell, leaving somewhat more than 450 cu. cm. for the payload 12, with due allowance for the volume expansion that takes place when the water freezes.

The payload 12 comprised a gas cell of the ion membrane type and its ancillaries. The cell had a peak power output of 600 mw. at 8 v. It was supplied through the tubes 22 and 24 with hydrogen and oxygen at substantially ordinary atmospheric pressure, at the rate of 2 grammes hydrogen and 0.25 gramme oxygen per twenty four hours.

Laboratory tests showed that the total heat losses from the inner shell to the outer shell, by combined heat transfer through convection, conduction and radiation, were 0.1 watt when the outer shell was maintained at −60° C. and the inner shell at 0° C. This loss value corresponds to a heat transfer rate w=86 calories/hour (0.1 watt). With the above indicated values for M and w, Equation 1 or 2 shows a useful service life of T=360 hours or fifteen days.

The total weight of the assembly, allowing 500 g. for the payload, is 1425 g.

The results would be somewhat less advantageous, though acceptable in many cases, if the water were replaced by calcium chloride hydrate or another suitable phase-transforming substance. Water definitely appears to be most desirable of the substances usable according to the invention, from the standpoint of thermal efficiency.

It is also contemplated that for certain applications, it may be found satisfactory to use means other than a phase transformation for generating the energy required to maintain the requisite isotherm temperature within the inner shell 4. The body of water 20 (or other phase-convertible substance) would then be omitted and may be replaced, for example, with a small electric heater. In fact, the heat stored in and/or generated by the payload 12 itself may in some cases be used as the sole source of heat energy within the inner shell.

While the long, resilient, coiled tubes 22 and 24 shown in FIG. 1 constitute a preferred form of the mechanical supporting (and electric and fluid conducting) means used in the invention, certain alternative forms of construction are also contemplated, and are illustrated in FIGS. 2, 3 and 4. In these views, the inner core structure within inner shell 4 is not shown but may be generally similar to that disclosed with reference to FIG. 1. Also, the screening shell 36 shown in FIG. 1 as interposed between the inner and outer shells 2 and 4 has not been shown in these figures for clarity, but it is to be understood that such screening shell, or equivalent radiation-screening structure, is preferably provided.

In the modifications now to be described (FIGS. 2-4) it is assumed that the payload contained in the shell 4 is, for example, an electronic unit such as a radio set, rather than an hydrogen cell unit as in FIG. 1, and hence does not require fluid flow connecting means.

In FIG. 2, the inner shell 4 is shown resiliently suspended from the outer shell 2 by means of upper suspension devices 50 and lower supension devices 52. There may be provided three (or more) upper and three (or more) lower suspension devices, arranged in equiangular relationship around the vertical axis of the assembly, as seen in plan. Each suspension device 50 or 52 is here shown as a fine string or wire of high-tensile extruded material possessing low thermal and electrical conductive properties, such as a suitable polyamid, e.g., nylon, having its outer end attached to one end of an associated tension spring 54 made of spring steel or the like. The outer end of the tension spring 54 of each suspension device is attached to the inner surface of outer shell 2 while the inner end of the nylon wire is attached to the outer end of the inner shell 4. Two of the suspension devices may be used as electrical conductor means for connecting of internal electrical equipment within shell 4 to an external circuit. For this purpose, the suspension wire of isolating material (such as nylon) of the selected suspension devices may be coated with a thin coating of conductive metal or graphite. The inner end of each conductive-coated wire, and the outer end of the spring 54 associated therewith, are then connected with the inner and outer shells 2 and 4 respectively, in the case of one wire, insulating connectors are used as indicated at 56 and 58 for the upper left suspension device in FIG. 2.

In the modification of FIG. 3, there are again provided upper suspension devices 60 and lower suspension devices 62, which may be similarly arranged as in FIG. 2, that is, in equispaced angular relationship in each set. Each suspension device may again consist of a nylon string or wire and may be associated with a tension spring such as 54 (FIG. 2), although this has not been shown. Alternatively, the suspension wires 60 and 62 may be fine steel wires having insulating beads 68 of ceramic composition interposed along their lengths, as shown. In the modification of FIG. 3, the suspension devices are not used as the electrical connecting means and the wires (whether nylon or steel) are consequently not coated with a conductive film. Instead, separate electric connecting leads 64 and 66 are provided, each having one end attaching to the inner shell 4 and its other end attaching to the outer shell 2 by way of respective connectors. It will be understood that if the shells 2 and 4 assumed to be at zero potential, as in FIG. 1, then one of the two conductors 64 and 66 would have its ends conductively connected with both shell surfaces. In accordance with the feature of the invention involving minimization of conductive heat transfer between the shells, the electrical conductors 64 and 66 are considerably increased in length over what would otherwise be necessary. Thus, each conductor 64, 66 is shown as having its outer end connecting with the outer shell 2 at the base of the shell and connecting with the inner shell 4 at the top. The conductors 64 and 66 are supported at points intermediate their lengths from suitable ones of the suspension wires 60 and 62 e.g., by way of the aforementioned beads 68. The conductors 64, 66 may of course be made even longer and more circuitous than shown in FIG. 2 further to diminish heat transfer by conduction therethrough.

In the modification of FIG. 4, the supporting means for the inner shell 4 comprise a plurality of coil springs such as 70 having inner and outer ends connected with the inner and outer shells respectively. As shown, there is an upper and a lower springs along the axis of the assembly and a plurality of lateral springs, such as three equispaced in the equatorial plane of the assembly; other arrangements and numbers may be used. The springs may be of steel, and one or two of them may be coated with a thin film of highly conductive material as earlier described for purposes of electrical connection.

In the various embodiments described, the electrical connections comprise fine wires of highly conductive material which are helically wound to increase their over-all length in order to diminish as far as possible the rate of conductive heat transfer thereto. Such fine helically wound wires may be wound around the circumference of a coiled tube of the type shown in FIG. 1, or around the circumference of an insulating, e.g., nylon, wire or string as in FIGS. 2 and 3, or about the circumference of the wire forming a steel coil spring such as 70 in FIG. 4.

In the modifications shown in FIGS. 2–4, it will be understood that if the payload is a hydrogen cell battery or the like, the necessary gas conduits would be provided in a suitable form consistent with the basic teachings of this invention, i.e. they would be so constructed as to minimize heat leakage by conduction along the tube walls. Where feasible, the tubes may form common structure with the shell supporting means and/or the electric conducting means. Thus, in the embodiment of FIG. 3, the circuitous conductors 62 and 64 may be provided in the form of steel tubes coated with a conductive skin layer.

In yet another modification, the inner shell 4 may be supported in spaced relation within the outer shell 2 by means of a plurality of rigid spacers, not shown, made of suitable rigid material having low heat (and electric) conductivity such as ceramic and plastic compositions, glass, silica, which may be positioned in a manner generally similar to the positioning of the coil springs 70 in FIG. 4, said spacers having sharply tapered or pointed ends or arrises at both ends thereof where they engage the surfaces of the outer and inner shells. The electric connections may then be provided in any of various ways earlier described, e.g. as in FIG. 3.

While in FIG. 1 the intermediate screening device interposed between the inner and outer shells is shown as consisting of a single wall of sheet material, such intermediate screening structure may advantageously comprise two, three, or more spaced walls of sheet material having reflective surfaces on both sides thereof, e.g. aluminium-plated glycol terephthalate (Mylar) sheet. Conveniently, the screening structure instead of being provided in the form of a complete egg-shaped sealed shell may take the form of a spirally wound flat sheet having nontouching turns, as shown at 72 in FIG. 5, which is cuitably supported between the shells 2 and 4, for example from the tube coils of FIG. 1, not here shown. As fragmentarily shown in dotted lines at 74, a corrugated sheet of generally similar material may be interposed between the coils of the spiral Mylar sheet 72. The screening structure may then be completed, at both ends of the structure, by flat generally circular end screens (not shown), e.g. laminated, aluminium-coated Mylar sheeting, positioned beyond the respective ends of the inner shell 4. Instead of or in addition to the sheet-like screening means described with reference to FIGS. 1 and 5, a pulverulent or particulate filling may be used to partipate in the heat-screening function. Such filling may comprise a mix of two or more constituents, the one being a good thermal insulator, such as silica or alumina powder, while the other constituent comprises particles having highly reflective surfaces, such as aluminium particles. Somewhat unexpectedly, it is found that in such a composite mix of particles, the anti-conducting and anti-radiating characteristics of the respective constituents tend to combine, and impart to the total mix extremely high overall heat insulating properties.

While the principles of the invention have now been made clear in illustrative embodiments, there will be immediately obvious to those skilled in the art many modifications in structure, arrangement, proportions, the elements, materials, and components, used in the practice of the invention and otherwise, which are particularly adapted to specific environments and operating requirements, without departing from these principles. The appended claims are therefore intended to cover and embrace any such modifications, within the limits only of the true spirit and scope of the invention.

What I claim is:

1. A thermally insulating assembly for protecting temperature sensitive equipment (12) having a prescribed operating temperature range, against external temperature substantially below said range, comprising an outer shell (2) entirely sealed throughout its periphery;

an inner shell (4) entirely sealed throughout its periphery, said equipment (12) being enclosed within said inner shell (4) prior to the sealing thereof said equipment being electrically connected through said inner and outer shells;

means (22, 24; 50, 52, 54; 60, 62; 70; 72) supporting said shells in spaced relation and connecting the inner shell with the outer shell, said supporting and connecting means having low heat conductivity for reducing conductive heat transfer between the shells and maintaining said heat transfer below a selected minimum, the space between the shells being evacuated;

reflective means for reducing radiation heat transfer between the shells;

and a filling material enclosed within said inner shell prior to the sealing thereof and entirely surrounding said equipment within said sealed inner shell, said filling material comprising a substance susceptible of undergoing a phase transformation at a temperature within said prescribed range, said equipment being sealed from filling material range.

2. Assembly according to claim 1 wherein said equipment is a fuel cell.

3. An assembly according to claim 1, wherein said substance comprises water.

4. An assembly according to claim 1, wherein said substance comprises a hydrate crystallizable at a temperature within said prescribed range.

5. An assembly according to claim 1 wherein said support and connecting means (22, 24) comprise elongated elements each having respective end portions (19, 21; 28, 32) attached to the respective shells (2, 4), said elements including circuitous portions to increase their length between the end portions atached to said shells and thereby reduce the rate of conductive heat transfer therethrough.

6. An assembly according to claim 5, wherein said elongated elements are made of resilient material for supporting the inner shell within the outer shell.

7. An assembly according to claim 5, wherein said connecting means comprise electrical conductor means connected interiorly of the inner shell, and exteriorly of the outer shell.

8. An assembly according to claim 5, wherein said connecting means comprise fluid-conducting tubing interconnecting the interior of the inner shell and the outside of the outer shell.

9. An assembly according to claim 5, wherein said elongated elements are wound as generally coaxial helices surrounding the inner shell.

10. An assembly according to claim 7, wherein said electrical conductor means is in the form of a thin skin coating of highly conductive material formed on the lateral surfaces of said elements.

11. An assembly according to claim 7, wherein said electrical conductor means is in the form of a thin wire of highly conductive material helically wound around the lateral surfaces of said elements.

12. An assembly according to claim 1, wherein the means reducing radiation heat transfer between the shells comprises a filling of particulate material including two intimately mixed constituents, one constituent consisting of particles having low thermal conductivity and the other constituent consisting of particles having reflective surfaces.

13. Fuel cell assembly for operation in environments of external temperatures substantially below the range of operating temperature of said cell comprising an inner, entirely sealed shell;

a fuel cell located within said inner shell;

first connecting means extending from said fuel cell to said inner shell and passing therethrough in sealed relation;

an outer, entirely sealed shell;

second connection means of high thermal resistance material joined to said first connecting means and resiliently supporting said inner shell and said fuel cell therein, in spaced relation from said outer shell, said second connecting means including circuitous portions to increase the length thereof between said shells and thereby reduce the rate of heat transfer between shells, said second connecting means passing through the outer shell in sealed relation;

the space between said shells being evacuated;

reflective means reducing radiation heat transfer between the shells;

and a filling material enclosed within said inner shell prior to the sealing thereof and substantially filling said inner shell and entirely surrounding said fuel cell element within said inner shell, said filling material comprising a substance susceptible of undergoing a phase transformation at a temperature within said range of operating temperature.

14. Assembly according to claim 13 wherein said substance is water.

15. Assembly according to claim 13, wherein said substance is a hydrate crystallizable at a temperature within said range of operating temperatures.

16. An assembly according to claim 13, wherein said high thermal resistance connecting means include circuitous tubing for conducting fuel to the fuel cell, and conductor means surrounding the surface of said tubing for conducting said electric current out of the fuel cell.

17. An assembly according to claim 13, wherein said high thermal resistance connecting means includes a pair of helically coiled tubes resiliently supporting the inner shell in the outer shell and conducting said fuel into the fuel cell.

References Cited

UNITED STATES PATENTS

| | | | |
|---|---|---|---|
| 1,266,780 | 5/1918 | Edison | 136—161.2 |
| 2,513,749 | 7/1950 | Schilling. | |
| 2,702,458 | 2/1955 | Del Mar. | |
| 2,913,511 | 11/1959 | Grubb | 136—86 |
| 3,166,511 | 1/1965 | Matsch et al. | |
| 3,204,804 | 9/1965 | Hnilicka. | |
| 3,110,633 | 11/1963 | Bachmann | 136—161 |

WINSTON A. DOUGLAS, Primary Examiner

H. A. FEELEY, Assistant Examiner

U.S. Cl. X.R.

136—166; 215—13; 220—9